US008468158B2

(12) United States Patent
Kumar et al.

(10) Patent No.: US 8,468,158 B2
(45) Date of Patent: Jun. 18, 2013

(54) ADAPTIVE WEIGHTED CRAWLING OF USER ACTIVITY FEEDS

(75) Inventors: Mani Kumar, Dhampur (IN); Pankaj Kothari, Bangalore (IN); Saurabh Sahni, Indore (IN)

(73) Assignee: Yahoo! Inc., Sunnyvale, CA (US)

( * ) Notice: Subject to any disclaimer, the term of this patent is extended or adjusted under 35 U.S.C. 154(b) by 703 days.

(21) Appl. No.: 12/266,508

(22) Filed: Nov. 6, 2008

(65) Prior Publication Data
US 2010/0114946 A1 May 6, 2010

(51) Int. Cl.
G06F 17/30 (2006.01)
G06F 7/00 (2006.01)

(52) U.S. Cl.
CPC ................ *G06F 17/30035* (2013.01)
USPC .......................... 707/737; 707/740

(58) Field of Classification Search
USPC ................................ 707/737, 740
See application file for complete search history.

(56) References Cited

U.S. PATENT DOCUMENTS

| | | | |
|---|---|---|---|
| 6,212,517 B1 | 4/2001 | Sato et al. | |
| 6,876,997 B1 | 4/2005 | Rorex et al. | |
| 7,308,643 B1 * | 12/2007 | Zhu et al. ................ | 715/206 |
| 7,328,401 B2 | 2/2008 | Obata et al. | |
| 7,680,773 B1 * | 3/2010 | Acharya et al. ............ | 707/737 |
| 2005/0022168 A1 | 1/2005 | Zhu et al. ................ | 717/124 |
| 2007/0260624 A1 * | 11/2007 | Chung et al. ............. | 707/101 |
| 2008/0120411 A1 * | 5/2008 | Eberle ...................... | 709/225 |
| 2008/0189169 A1 * | 8/2008 | Turpin et al. ............. | 705/10 |
| 2009/0210407 A1 * | 8/2009 | Freire et al. .............. | 707/5 |

OTHER PUBLICATIONS

Word Spy—lifestreaming, http://wordspy.com/words/lifestreaming.asp, accessed Sep. 15, 2008, 3 pgs.
Aggregator—Wikipedia, http://en.wikipedia.org/w/index.php?title=Aggregator&printable=yes, accessed Sep. 15, 2008, 3 pgs.
Expectation—maximization algorithm, Wikipedia.org, http://en.wikipwdia.org/w/index.php?title=Expectation-maximization, accessed Sep. 3, 2008, 9 pgs.
Life Stream Aggregators vs. Standard Social Networking, razorshine, http://www.razorshine.com/archive/2008/04/11/life-stream-aggregators-do-vs-standard-soc, accessed Nov. 6, 2008, 6 pgs.
K-means algorithm—Wikipedia.org, http://en.wikipedia.org/w/index.php?title=K-means_algorithm&prin, accessed Nov. 6, 2008, 5 pgs.
FriendFeed—About Us, http://friendfeed.com/about/, 2 pgs, accessed Nov. 6, 2008.
MyBlogLog.com, http://www.mybloglog.com/, accessed Nov. 6, 2008, 1 pg.
About—Lifestream Blog, http://lifestreamblog.com/about/, accessed Nov. 6, 2008, 3 pgs.

* cited by examiner

Primary Examiner — Mariela Reyes (57) ABSTRACT

Embodiments are directed towards determining frequencies for adaptively crawling user activity feeds, by taking into account user activity patterns, as well as a type or nature of a service to be crawled. A statistical model of activity patterns is generated for each user and user activity source based on various parameters. The activity patterns may be weighted to account for variation in relevancy of user content. Various measures are generated that are adaptive by being updated at a rate determined sufficient to detect user activity pattern changes. The statistical model produces clusters of users for each service. A crawling frequency may be assigned to the various clusters such that different users for a given service may have content crawled at different frequencies.

20 Claims, 4 Drawing Sheets

ADAPTIVE WEIGHTED CRAWLING OF USER ACTIVITY FEEDS

TECHNICAL FIELD

The present invention relates generally to aggregation of content feeds over a network and, more particularly, but not exclusively to adaptively crawling user activity feeds by clustering users within various search frequencies based at least on user behavior patterns.

BACKGROUND

Tremendous changes have been occurring in the Internet that influence our everyday lives. For example, online social networks have become the new meeting grounds. The development of such online social networks touch countless aspects of our everyday lives, providing instant access to people of similar mindsets, and enabling us to form partnerships with more people in more ways than ever before. Individuals may select to post information about themselves, their friends, family, or the like, on the Internet using any of a variety of tools, websites, or the like. In fact, because there are so many different places where a person might select to provide information, there are now just too many social sites out there for anyone to be able to keep up with all of the information that may be posted.

To help address this situation, many people employ aggregator tools. Aggregators are applications that are directed towards reducing the time and effort needed by a user to regularly check various websites for updates. The aggregator often performs such tasks, instead. Once a user subscribes to an aggregator, the aggregator checks various specified websites, or other sources, for changes in content, and if a change is detected, retrieves the update. The updates may then be provided to the subscriber, often in a single stream. One type of aggregator that has recently become popular is known as lifestreaming aggregators, or simply lifestreaming. Lifestreaming aggregators create an online record of a user's daily activities by aggregating their online content from such as blog posts, video logs (vlog) posts, online photo sites, and/or any of a variety of other specified social network sites. Users may provide their usernames for different sites, such as Flickr, YouTube, last.fm, Netflix, twitter, delicious, dig, or any of a variety of other sites (to name just a few). The lifestreaming aggregator then crawls the identified sites and aggregates or collects updates for the users.

The popularity of such lifestreaming may be attributed to that fact that such aggregation makes it easier for people to look at what someone else, such as friends, family, or the like is doing over the web in a convenient manner. A benefit for many users of such lifestreaming is that the user activity feeds are updated virtually in real-time providing enhanced user experience often over email feeds, or other slower mechanisms of communication. To make these aggregation feeds real-time, the aggregator often must crawl several websites aggressively. However, as their user base increases, many websites might find that they need to limit their hit rates for crawlers. This hit rate limiting is often done to prevent the website from responding too slow to other types of requests for content, and/or becoming overloaded and failing.

However, for many users of lifestreaming, real-time reporting may be essential, because information may become less useful as it gets older. Consider, for example, Bob posted a message on a website, or some status messaging site, stating that he would be "on Mission Street for the next hour—does anyone around want to have coffee?" If Alice, who was on Mission Street at that time received Bob's message outside of the specified one hour window, the update message would have virtually no value to her. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards determining frequencies for adaptively crawling user activity feeds by taking into account dynamic changes in a user's activity patterns, as well as a type or nature of a service to be crawled. A statistical model of activity patterns is generated for each user and user activity source based on various parameters. The activity patterns may be weighted to account for variation in relevancy of user content. Various measures, such as those described in more detail below, are generated that are adaptive by being updated at a rate determined sufficient to detect user activity pattern changes. The statistical model produces clusters of users for each service. A crawling frequency may be assigned to the various clusters such that different users for a given service may have content crawled at different frequencies. As a user's activity pattern changes, the user may be re-classified into a different frequency cluster. By adapting the frequency of crawling for a user based on the user's activity pattern changes, aggregators may keep, for example, various lifestreaming aggregators, and/or other types of aggregators, or information feeds, updated while reducing hits on the rate limits of crawled sites.

Illustrative Operating Environment

Figure 1:
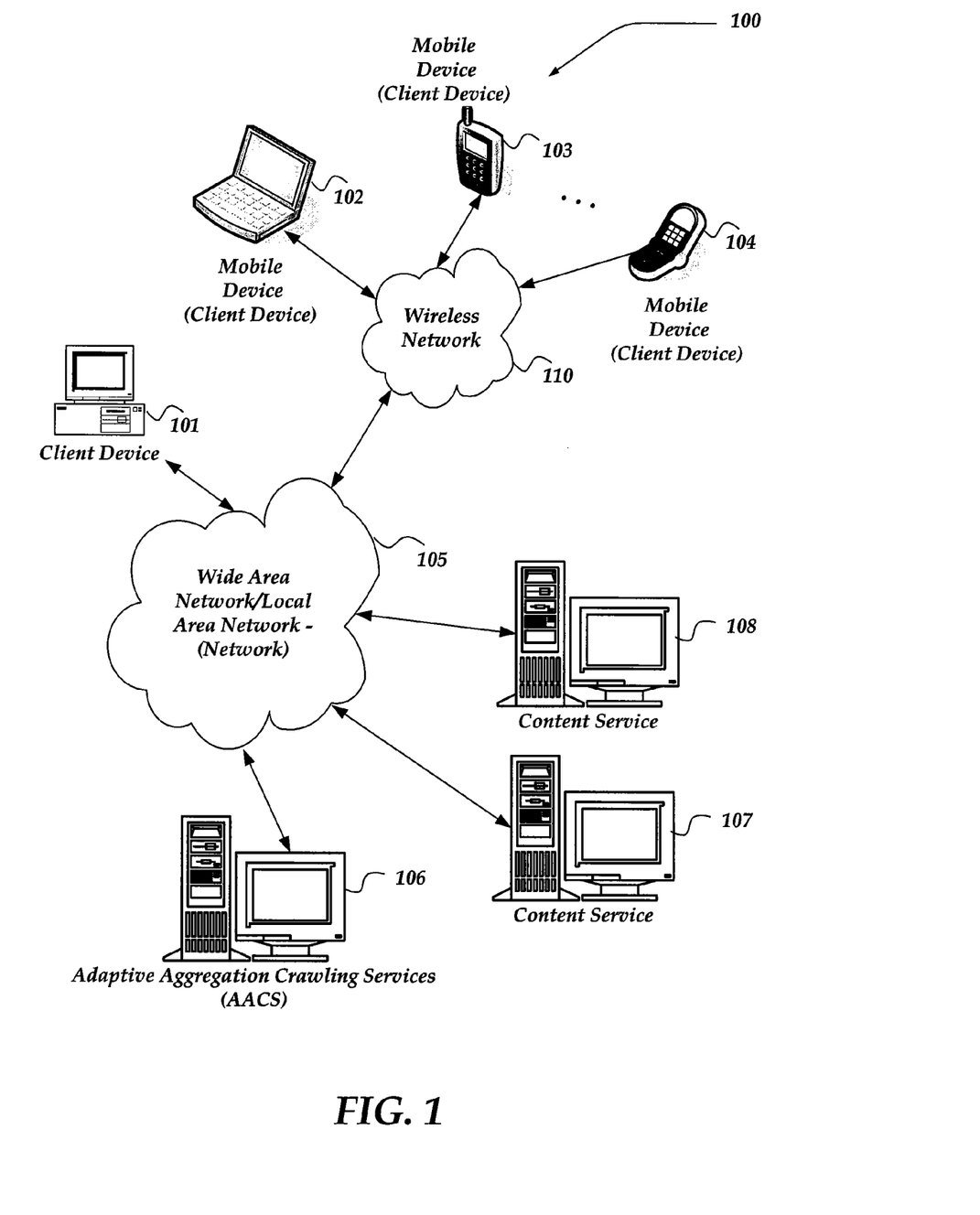
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 105, wireless network 110, Adaptive Aggregation Crawling Services (AACS) 106, client devices 101-104, and content services 107-108.

One embodiment of client devices 101-103 is described in more detail below in conjunction with FIG. 2. Generally, client devices 102-104 may include virtually any portable computing device capable of receiving and sending a message over a network, such as network 105, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing search queries, or the like. Client device 101 may also include client applications such as those described above, as well as being configured to provide location information.

The set of such devices may include devices that typically connect using a wired or wireless communications medium such as personal computers, multiprocessor systems, microprocessor-based or programmable consumer electronics, network PCs, or the like. Moreover, at least some of client devices 102-104 may operate over wired and/or wireless network.

A web-enabled client device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform a search over a network. However, another application may also be used to perform a search over the network.

Client devices 101-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, client devices 101-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent to AACS 106, content services 107-108, or other computing devices.

Client devices 101-104 may further be configured to include a client application that enables the end-user to log into an end-user account that may be managed by another computing device, such as content services 107-108, AACS 106, or the like. Such end-user account, for example, may be configured to enable the end-user to receive subscribe to one or more RSS feeds, aggregation feeds, or any of a variety of other social networking activities. However, participation in various social networking activities, including participation in receiving aggregation feeds, or the like, may also be performed without logging into the end-user account.

In one embodiment, client devices 101-104 may employ one or more client applications to interact with content services 107-108 to provide content/services and/or access content and/or services. In one embodiment, such content and/or services may include providing and/or accessing blog content, vlog content, music audio content, content, textual content, content feeds, messages, graphical content, or any of a variety of social networking content and/or services. Thus, in one embodiment, client devices 101-104 might enable a user to provide content to one or more of content services 107-108. For example, client devices 101-104 might enable a user to update their blog website, provide photographs, videos, music content, and/or any of a variety of other content to content services 107-108, such that other users might be allowed to access the "posted" content. Client devices 101-104 may also enable a user to receive a message, such as from an aggregation feed, or the like, indicating that some other user has updated their posted content. In one embodiment, the user may then employ the received message to access the other user's content. However, client devices 101-104 are not constrained to providing and/or accessing social networking content/services and virtually any other form of content/services may be accessed and/or provided using client devices 101-104.

Wireless network 110 is configured to couple client devices 102-104 and its components with network 105. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), $4^{th}$ (4G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 105 is configured to couple network devices with other computing devices, including, AACS 106, content services 107-108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of AACS 106 is described in more detail below in conjunction with FIG. 3. Briefly, however, AACS 106 may include any computing device capable of connecting to network 105 to adaptively crawl various network sites, such as may be hosted at content services 107-108, based, at least in part, on detected changes in user behaviors. AACS 106 may collect information about users over time for use in clustering the users for a given service. As used herein, the term "Services" refers to any of a variety of network data sources, including, but not limited to an RSS feed, a news source, an image source, a blog source, a vlog source, or the like, for which a user may seek to be provided change information about that service.

The information collected by AACS 106 may include, but is not limited to individual user behaviors, information about a strength of a user's connection with other users, a popularity of a user, and an indicator of a quality of content from the user. Additionally, information about any rate limits from a service may also be collected. Such information may then be employed by AACS 106 to cluster the users for a given service into frequency clusters. That is, in one embodiment, for a given service, each cluster of users might have information crawled for them for that service at a defined frequency. It is noted that because a user may subscribe to different services, the user might be classified into different frequency clusters that are crawled at different frequencies, for the different services.

As a change in a behavior pattern of a user is detected, the user may be reclassified into a different frequency cluster for the service. In this manner, crawling of services for a given user may adapt to changes of the user. AACS 106 may provide the frequency clustering of users for a service to one or more search tools, aggregation components, or the like, for use in collecting information for the users, which may then be sent to the user. In one embodiment, AACS 106 may provide the frequency clustering information to another network device, a client device that may perform aggregation and/or other crawling services for a user, and/or employ a crawling or other search service within AACS 106. AACS 106 may employ, in one embodiment, a process such as that which is described in more detail below in conjunction with FIG. 4 to perform at least some of its actions.

Devices that may operate as AACS 106 include various network devices, including, but not limited to personal computers, desktop computers, multiprocessor systems, microprocessor-based or programmable consumer electronics, network PCs, servers, network appliances, and the like.

Although FIG. 1 illustrates AACS 106 as a single computing device, the invention is not so limited. For example, one or more functions of AACS 106 may be distributed across one or more distinct computing devices. For example, collecting user patterns, rate limits, and/or other information may be performed by one network device, determining user frequency clusters may be performed by another network device, and/or performing the adaptive crawling based on the user frequency clusters may be performed by still another computing device, without departing from the scope or spirit of the present invention. However, other arrangements may also be employed. Thus, the invention is not to be limited to any particular distribution of functions, and a variety of arrangements is envisaged and is within the scope of the invention.

Content services 107-108 represents any of a variety of network devices to provide content and/or services accessible by client devices 101-104. Such services include, but are not limited to merchant sites, educational sites, news sites, personal sites, music sites, video sites, blog sites, vlog sites, and/or any of a variety of social networking sites. In fact, content services 107-108 may provide virtually any content and/or service that a user of client devices 101-104 may want to provide to another person. For example, such content may include, but is not limited to photographs, articles, advertisements, news, editorials, messages such as, but not limited to those messages known as tweets, or the like. Thus, in one embodiment, content services 107-108 may also include messaging services, including but not limited to email services, IMS services, SMS services, or the like.

Devices that may operate as content servers 107-18 include personal computers, desktop computers, multiprocessor systems, microprocessor-based or programmable consumer electronics, network PCs, servers, and the like.

Illustrative Client Device

Figure 2:
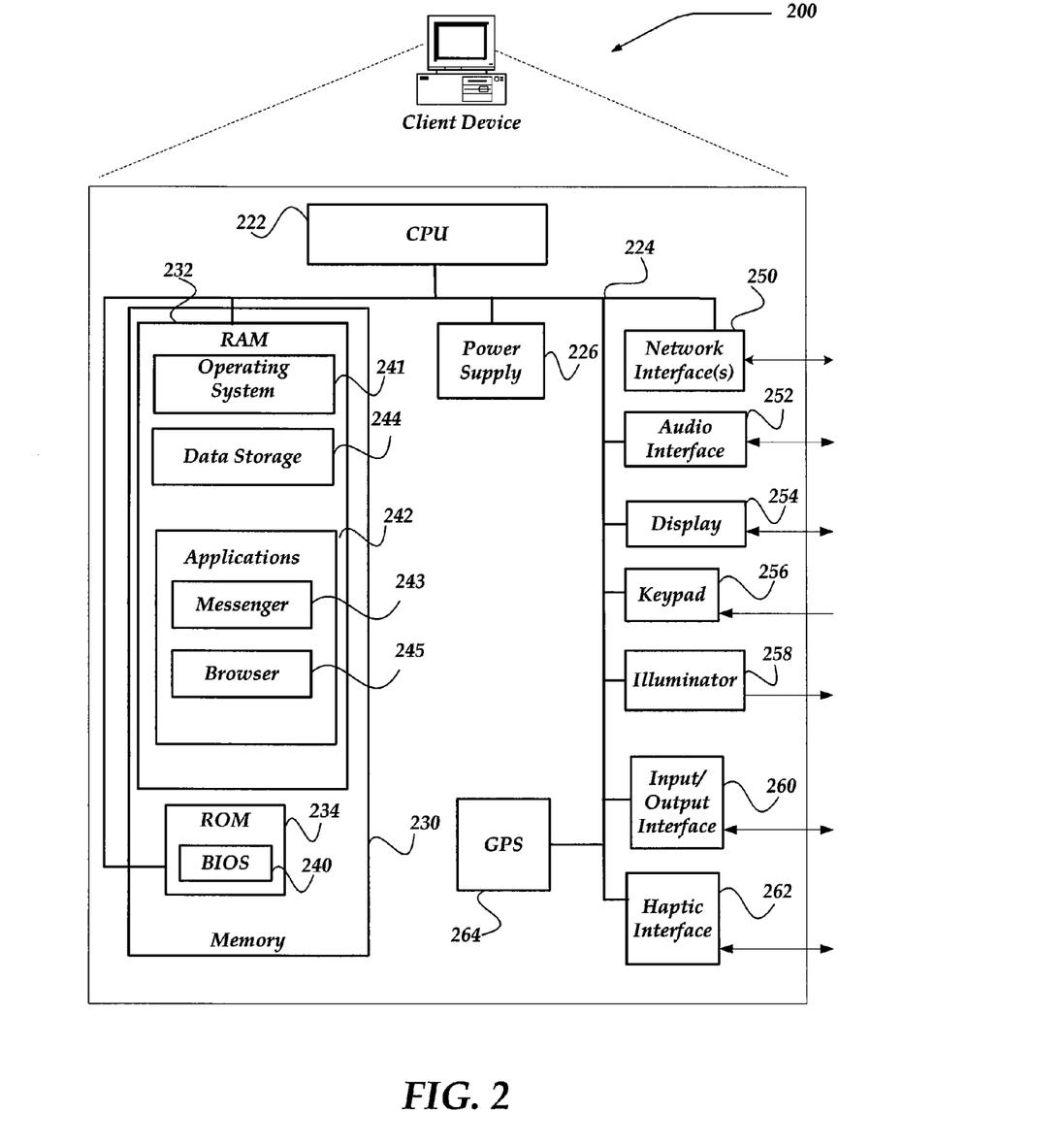
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgment for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like. In one embodiment, tracking of a user's networking activities may be achieved by monitoring the network address associated with client device 200, and/or a location of client device 200.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store social networking information including address books, buddy lists, aliases, or the like. Data storage 244 may further include any of a variety of information useable for managing feeds to various data services, such as aggregation feeds, RSS feeds, messaging feeds, or the like. In one embodiment data storage 244 may also include content for which a user of client device 200 has accessed, and/or seeks to post to a content site. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

In one embodiment, browser 245 may be configured to enable a user to post content to a content service, such as those described above in conjunction with FIG. 1, and/or receive messages, and/or view content from any of a variety of messaging services, content services, or the like. In one embodiment, browser 245 may enable a user to register to receive aggregation feeds, RSS feeds, or the like. In one embodiment, tracking of a user's networking behavior patterns may be performed by tracking activities performed through the user's browser 245. Cookies may also be used to enable behavior tracking. However, the information is not constrained to monitoring a user's networking activities based on cookies, and any of a variety of other mechanisms may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 243 may be configured as an IM application, such as AOL Instant Messenger, Yahoo! Messenger, NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200. As described above, messenger 243 may integrate with browser 245 to enable alerts, aggregation messages, and/or other feed messages to be provided to a user of client device 200.

Illustrative Network Device

Figure 3:
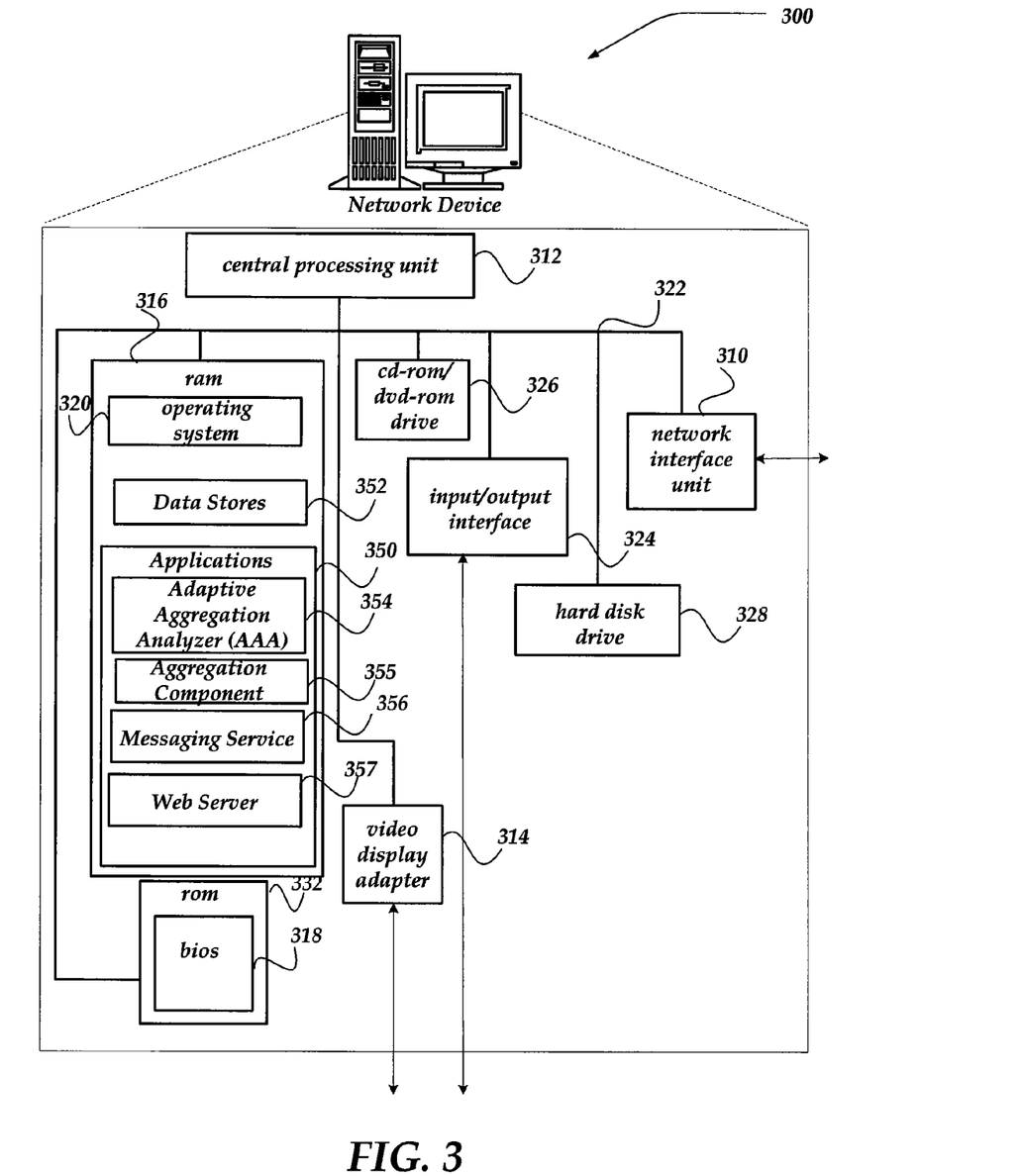
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, AACS 106 of FIG. 1.

Network device 300 includes processing unit 312, video display adapter 314, input/output interface 324, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

As shown, data stores 352 may include a database, text, spreadsheet, folder, file, or the like, that may be configured to maintain and store information about users, user activities, services, statistical data, data obtained from crawling various services, crawling frequency information, or the like. In one embodiment, at least some of data store 352 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web server 357, messaging server 356, aggregation component 355, and Adaptive Aggregation Analyzer (AAA) may also be included as application programs within applications 350.

Web server 357 represent any of a variety of services that are configured to provide content, including messages, over a network to another computing device. Thus, web server 357 includes for example, a web server, a File Transfer Protocol (FTP) server, a database server, a content server, or the like. Web server 357 may provide the content including messages over the network using any of a variety of formats, including, but not limited to WAP, HDML, WML, SMGL, HTML, XML, cHTML, xHTML, or the like. Thus, in one embodiment, web server 357 may be configured to enable a user to register for an aggregation service, feed service, or the like. Web server 367 may also be configured to provide messages, including alerts, or the like, to a user, as well as virtually any of variety of content to a user.

Messaging server 356 may include virtually any computing component or components configured and arranged to forward messages from message user agents, and/or other message servers, or to deliver messages to a local message store, such as data store 354, or the like. Thus, messaging server 356 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like. Messaging server 356 may also be managed by one or more components of messaging server 356. Thus, messaging server 356 may also be configured to manage SMS messages, IM, MMS, IRC, RSS feeds, mIRC, aggregation feeds, or any of a variety of other message types. In one embodiment, messaging server 356 may enable users to initiate and/or otherwise conduct chat sessions, VOIP sessions, or the like. Thus, in one embodiment, messaging server 356 may be configured to interact with web server 357 for use in managing adaptive aggregation services.

Aggregation component 355 includes virtually any applications, scripts, robots, spiders, and/or other components useable to crawl various sites over a network for content. In one embodiment, aggregation component 355 may include one or more aggregation services that are configured to crawl various sites and identify changes to content at a site. If the content is detected as having changed for a given site, based on some criteria, aggregation services 355 may collect or aggregate the changes and provide a requesting user an alert indicating that content has changed, provide a link to the changed content, and/or provide the changed content. In one embodiment, aggregation services 355 might provide the alert or some other signal to messaging service 356 and/or web server 357 for use in providing aggregation messages, alerts, or the like, to a subscribing user.

In one embodiment, aggregation component 355 might crawl different services for different users based on a frequency of crawling that is provided by AAA 354. In one embodiment, AAA 354 might determine clusters of subscribing users for a given service. AAA 354 may further determine a frequency of crawling for each of the determined clusters. AAA 354 may then provide the service information, user cluster information, and/or the frequency of crawling information to aggregation component 355.

Thus, AAA 354 is configured to perform data collection and to perform statistical analysis on the collected data to generate a model of user network activity patterns which include changes in a user's behavior. The model identifies activity patterns of each user and service source, and enables a weighting to be applied based on an importance of a user's content based on it popularity, quality, or the like. The weighted mode then enables a crawling frequency to be determined for each user and service source.

Data collection about a user's networking activities may be performed virtually in real-time. Thus, as a user sends a message, receives a message, posts content, accesses content, changes a physical location as indicated by information from their client device, or the like, such information may be collected and stored in data stores 352. It is noted that the invention is not limited to collection of just the information noted above, and virtually any information about a user's networking activities may be collected. For example, information about the user, obtained from postings, messages, or the like, from other users may also be collected. For example, if a user posts content, for which other users then provide comments, ratings, feedback, or the like, about that user's posted content, AAA 354 may also collect the feedback about the user's postings. If the user posts tags, labels, or the like, about their content, and/or others provide tags, labels, or the like, about that user's content, such tags, labels, or the like, may also be collected. Moreover, information about when a user performs a networking activity may also be collected and stored in data stores 352.

Thus, AAA 354 may collect information that may be classified as user specific information, and other information that may be classified as service source specific information. For example, AAA 354 may collect user specific information that includes, but is not limited to content generation patterns for user for a give service source. Such content generation patterns may indicate how frequently a user generates content for a give service source. AAA 354 may also collect information about a strength of a user's connections. Such strength might represent a two-way relationship between a user and other users. In one embodiment, such information may be obtained at least in part based on a degree of separation within a connection graph, or the like. In one embodiment, a strength might be based on a given service source. Thus, in one embodiment, a user might have a high two-way relationship strength between users in one service source, but a low two-way relationship strength in a different service source.

AAA 354 might also obtain information about a popularity of a user for a given service source. Such popularity might represent, for example information about how many other users subscribe to follow network postings of the user. As such, popularity represents a one-way measure for a user. AAA 354 may further collect information about a popularity of a given posting of a user. That is, such popularity might represent how often a user's posting is searched, read, or the like. It might be obtained, for example, based on a number of page hits the user's posting receives, a web search ranking, or the like.

AAA 354 may further collect information about a popularity of a topic, tags of content generated by a user, or the like. Such information might be obtained, for example, based on a ranking of a topic, tag, or the like, in a search ranking, page hits, or the like. AAA may also collect information about a user's cyclical activity patterns. For example, if a user produces more content during a particular time of day, day of the week, month, time of year, or the like, such information may also be collected and stored in data stores 352 for each user and/or user/service source relationship. As noted above, the invention is not limited to this information, and other user specific information may also be collected and used in determining a frequency cluster for placing a user.

AAA 354 also collects information about a given service source, including a type of service source, a pattern of content generation for a service source, and/or a rate limit that may be defined for a given service source. The type of service might be for example, a twitter message service, a movie blog, or the like. Such type information might provide information about how often to crawl the service. For example, a messaging service might be crawled more frequently, than, for example, a movie blog service, or the like. Patterns of content generation, as noted above, might indicate that a given service is more popular (is accessed more often, has postings more often, or the like) during a particular time of day, day of the week, month, time of year, or the like. As noted above, a rate limit represents a limit set by a service source that indicates that the service can not be crawled more than the set rate. For example, a service might indicate that a crawler can not exceed two times per second for crawling the service.

AAA 354 may then employ a variety of computations based on the collected information. The following is but one embodiment of a possible approach useable for combing collection information for use in classifying a user into a give frequency cluster for a give service, where the cluster is used to determine how often to crawl the given service for the users in that cluster.

In one embodiment, global calculations are performed for all subscribing users, determining average number of update per service per user, average number of connections per user, average number of followers per user, and the like. That is, in one embodiment, the following global calculations might be performed at least once per week (although the calculations may also be calculated at other frequencies):

Global_updates_<service name>=average number of updates per user. As noted, this is calculated for each service. The average includes users with at least one update to their networking activities in a last 30 days. However, other values may also be employed. In one embodiment, a total number of updates from all users is divided by a total number of users to provide an average number of updates per user, which is calculated for each service.

Global_connections=Average number of connections, where average includes users with at least one connection, where connections refer to two-way connections. The total number of determined connections/contacts from all subscribing users is divided by a total of number of users to generate the average number of connections per user.

Global_followers=Average number of followers, where average includes users with at least one follower. The total number of followers from all the user is divided by a total number of users is used to generate an Average number of followers.

In one embodiment, a variety of computations may be performed per user per day. It is noted that the invention is not limited to this frequency for the following computations, and computations may be performed more or less frequently, without departing from the scope of the invention. In any event, the following computations may be performed:

User update score. This computation depends upon an individual user's pattern of network activities per service and global update patterns. In one embodiment, the average global time between updates per user may be 86400*number of users of service/total number of updates in a day. That is, then, the average time gap between two updates from an average user for a particular service.

An average time between two updates for a service and user, in one embodiment, considering up to a last twenty updates for a month, that is the average time gap between two updates from a particular user on a particular service.

Update_score_<user>_<service>=the minimum of (Min_US+K_US*Average time between two updates for a service and user/Average global time between updates per user, Max_US). In the above, Min_US represents the minimum update score allowed. K_US is a constant of proportionality for the Update Score, and Max_US is the maximum update score allowed. Thus, Update_score_<user><service> is an update score for a particular user and particular service. In one embodiment, the Update_score_<user><service> may have a value between zero and hundred. However, update_score_<user><service> may also have other values as well.

Popularity Score: The popularity score depends on a number of followers and average number of global followers. It may be determined, in one embodiment, as:

Popularity_Score_<user>=minimum of (Min_PS+K_PS*number of followers/global_followers, Max_PS), where, min_PS represents a minimum popularity score allowed, K_PS is a constant of proportionality for popularity scores, and Max_PS is a maximum popularity score allowed. In one embodiment, the Popularity_score_<user> may lie between zero and hundred; however, the invention is not limited to such values, and Popularity_score_<user> may also have other values.

Connection Score: This computation depends on a number of contacts and an average number of global connections, and may be determined, in one embodiment, as:

Connection_score<user>=minimum of (Min_CS+K_CS*number of connections/global_connections, Max_CS), where Min_CS is the minimum connection score allowed, K_CS is the constant of proportionality for connection scores, and Max_CS is a maximum connection score allowed. In one embodiment, the Connection_score_<user> may lie between zero and hundred; however, the invention is not limited to such values, and Connection_score_<user> may, in another embodiment, have other values.

Quality of Vitality Content: In one embodiment, a page rank of user blogs, or other posting sites, may be determined based, on a search. That is, such computation may be determined, in one embodiment, as:

Vital_content_quality_<user>=minimum of (Min_Qt+K_Qt*Max (PR of blogs or other posting sites), Max_Qt), where Min_Qt represents a minimum quality score allowed, K_Qt is a constant of proportionality for quality scores, and Max_Qt is a maximum quality score allowed. Max (PR of blogs or other posting sites) represents a maximum network search ranking across several search engines. A number of search engines may be based on a variety of criteria, including, but not limited to a variation determination across the search engines, a cost factor, or the like. In one embodiment, the Vital_content_quality_<user> may lie between zero and hundred; however, in another embodiment, Vital_content_quality_<user> may have other values.

Based on the above computations, overall scores may be determined for users and services. Thus, in one embodiment, a user score may be determined as a weighted sum of all of the above computations. That is:

User_score_<user>=minimum of (Min_UserScore+K2*Vital_content_quality_<user>+K3*Connection_Score_<user>+K4*Popularity_Score_<user>, Max_UserScore), where K2, K3, and K4 are constants.

For each service and user, the following may also be determined:

User_Score_<user>_<service>=K1*Update_score_<user>_<service>+User_score_<user>

Based on the user scores (which may also be between zero and hundred), clusters may then be determined. That is, based on the user scores, the users may be grouped into a number of clusters using any of a variety of clustering mechanisms, including, but not limited K-means clustering, Expectation-Maximization (EM) algorithms, co-relation clustering, or the like. The invention is not limited to these clustering mechanisms, and others may also be used, without departing from the scope of the invention.

In any event, in one embodiment, an average maximum requests (Avg_max_req) may be determined as an average requests per user per service per day. In one embodiment, this may be based on a rate limit of the given service per day divided by a number of users. A mean user score (mean_user_score) may also be determined as an average user score per service.

Users are clustered into a number of sets based on their user score. In one embodiment, the number of cluster sets may be set to some value between 3 and 7. However, the invention is not constrained to these numbers of clustered user sets, and other clustered user sets may also be used. In any event, a size of each cluster is then determined. Moreover, one network service might have a different number of cluster sets than another network service. For example, one network service might have five clusters in the cluster sets, while another network service might have 8 or nine clusters.

From the clusters a center or mean user score for each cluster may be determined as Mi, where i represents the number of the clustered user set. From these determinations, a frequency _cluster_X may be determined as a number of times each user is crawled per day. In one embodiment, this may be determined as:

Maximum of (Min_freq, Avg_max_req*M_X/Mean_User_score).

In one embodiment, outliers may be addressed using any of a variety of mechanisms, including, but not limited, for example, in repositioning of the outliers. From this, each associated service may then be crawled at the determined frequency for those users assigned to a give cluster. In one non-exhaustive, non-limiting example, for a given service, with say three clusters of users, the service might be crawled for a first cluster set of users every hour, while a second cluster set of users might be crawled every other hour, while the third set might be crawled every third hour, or the like. Clearly, other frequencies, and cluster sets might also be used.

Generalized Operation

Figure 4:
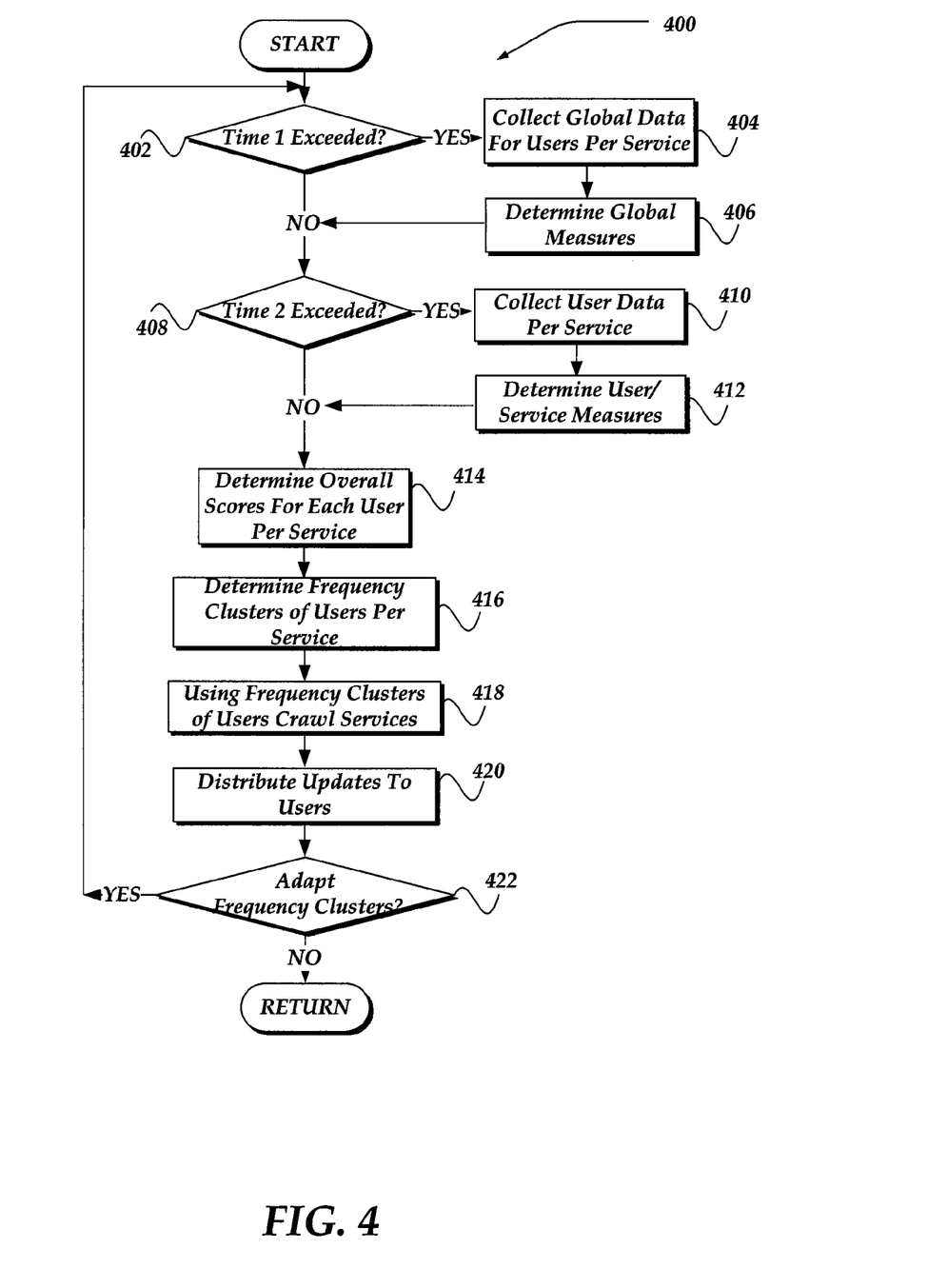
FIG. 4 illustrates a logical flow diagram generally showing one embodiment of an overview process for using adaptive crawling of user activity feeds based on changes in user networking patterns, and clustered user sets.

The operation of certain aspects of the invention will now be described with respect to FIG. 4. FIG. 4 illustrates a logical flow diagram generally showing one embodiment of an overview process for using adaptive crawling of user activity feeds based on changes in user networking patterns, and clustered user sets. Process 400 of FIG. 4 may be implemented within AACS 106 of FIG. 1, in one embodiment.

Process 400 begins, after a start block, at decision block 402, where a determination is made whether a first time is exceeded. In one embodiment, the first time might represent a week. However, the first time might also represent other values, including but not limited to bi-weekly, or the like. In any event, in a first case, where global data has not been initially collected, decision block 402 might be satisfied. If decision block 402 is not satisfied, processing flows to decision block 408.

If decision block 402 is satisfied then processing flows to block 404, where global data is collected for users per service, including, but not limited to user update frequency, number of updates for a user, number of connections per user, number of followers per user, and the like. Processing flows next to block 406 were various global measures are determined as above, including, but not limited to calculating average number of updates per service per user, average number of connections per user, and average number of followers per user. Other computations may also be performed globally. Processing then flows to decision block 408.

At decision block 408, a determination is made whether a second time is exceeded, for data collections, and updates. In one embodiment, the second time represents a frequency for collecting user data for given service sources. In one embodiment, the second time may be configured such that data for different users are collected at different times. For example, while data might be collected for users multiple times during a day, the data collection might be scattered such that not every user's data is collected during any single given time. For example, data for one set of users might be collected at time one, while a second set of users might be collected at time two, and so forth. Thus, the determination at block 408 is not to be construed as a single time test, but rather represents a time test for a given set of users. In any event, the second time might be once per day, twice per day, or more or less often, based on a number of users, an amount of data to be collected, network activities, engineering judgment, or the like. In a first instance, however, where no data for users has been initially collected, then it may be determined that the second time is exceeded. However, if the second time is not exceeded, processing flows to block 414.

If the second time is exceeded, however, processing moves to block 410 to collect the user data per service. In one embodiment, the data collected includes at least the data described above as user specific information, including, but not limited to content generation patterns, strength of user connections, popularity of users, popularity of a user's posting, popularity of a topic/tag of content generated by the user, cyclical activity pattern data, or the like. Processing then flows to block 412, where various user/service measures are computed, such as those described above, including, but not limited to user update scores, popularity scores, connection scores, and quality of vitality content. Processing then flows to block 414.

At block 414, overall scores for each user per service may be computed as described above. Such overall scores for users may be calculated using all of the above scores by assigning weights to the scores. The overall scores for each user may be computed everyday or at virtually any other frequency to ensure that pattern changes of users are captured. Thus, in one embodiment, the overall scores, and the like, might be computed more frequently than once per day.

Processing flows next to block 416, where users can be divided into different clusters using various mechanisms, including but not limited to K-means, EM algorithms, corelation clustering techniques, or the like. A crawling frequency may then be assigned to each cluster considering the average scores for all of the users in that cluster, as well as service specific measures, such as type of service, pattern content generation, rate limits, and the like. Clusters of users may be updated or other revised, such that users may be moved from one cluster to another cluster based on changes in their detected activity behaviors.

Processing continues to block 418, where each of the services is crawled based for users within a given cluster at the cluster frequency. In this manner, crawling may be optimized for user activity feeds based on such parameters as a user's pattern of generating content, as well as characteristics of a service.

Processing the flows to block 420, where the results of the services crawling are distributed to various users. In one embodiment, the results might be provided to an aggregation service that aggregates the results and provides the aggregated results to the users.

Continuing next to decision block 422, a determination is made whether to continue adaptive frequency crawling based on clustered user sets. If so, processing may loop back to decision block 402; otherwise, processing returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
    a transceiver to send and receive data over a network; and
    a processor that is operative to perform actions, including:
        for each of a plurality of users of a user activity feed within a plurality of aggregated feeds that the user subscribes to:
            collecting information about the respective user's networking activity patterns, wherein the collected information includes at least one weight for content in the collected information, at least one strength value for a two-way relationship between the user and at least one other user, and at least one strength value for each service source that provides content;
            determining from the collected information, a user's update score, popularity score, connection score, and quality of vitality score; and
            combining the user's update score, popularity score, connection score, and quality of vitality score to generate an adaptive overall user score; and
        based on the overall user scores for the each of the plurality of users, clustering the users into a plurality of different clusters;
        assigning a different crawling frequency to each of the plurality of different clusters, wherein each crawling frequency is determined based at least on the adaptive overall user scores and a pattern of content generation of the user activity feed for each of the plurality of users that are clustered in each of the different clusters;
        periodically crawling the user activity feed for each user within a given cluster within the plurality of different clusters at the assigned crawling frequency to collect update information from the user activity feed for each user within the cluster; and
        distributing to each of the plurality of users the collected update information for the respective user to display at a respective client device.

2. The network device of claim 1, wherein assigning the crawling frequency is based on a function of an average of user scores for the users within a given cluster and information about the user activity feed, including a rate limited for crawling the user activity feed.

3. The network device of claim 1, wherein clustering the users into a plurality of different clusters is performed using one of a K-means algorithm, an expectation-maximization algorithm, or a co-relation clustering algorithm.

4. The network device of claim 1, wherein the collected information includes at least one of a content generation pattern for each user, a strength of a user's connections, a popularity of each user, a popularity of a posting by each user, a popularity of a topic or tag of content generated by each user, or a cyclical activity pattern for each user.

5. The network device of claim 1, updating each of the user's adaptive overall user scores at a frequency to detect a change in the respective user's network activity patterns.

6. The network device of claim 1, wherein assigning the crawling frequency is based on a function of an average of overall scores for users within a cluster and at least one of a type of the user activity feed or a rate limit for the user activity feed.

7. A system that is operative to manage a search query, comprising:
    an aggregator configured to adaptively crawl a plurality of network services to retrieve changes to content at one or more of the plurality of network services, wherein at least one network service is associated with a user activity feed within aggregated feeds to which a user subscribes; and
    an adaptive aggregation component having computer-executable instructions, the computer-executable instructions being installed onto a computing device, wherein the computing device Comprises:
        a memory device for storing the computer-executable instructions; and
        a processor device that executes the computer-executable instructions to perform actions, comprising:
            collecting information about each of a plurality of users for each of the plurality of network services, within the aggregated feeds to which a user subscribes, to detect dynamic changes in each user's network activity, wherein the collected information includes at least one weight for content in the collected information, at least one strength value for a two-way relationship between the user and at least one other user, and at least one strength value for each service source that provides content;
            employing the collected information about each of the plurality of users to generate an adaptive overall user score for each user for each network service;
            for each of the plurality of network services, generating clusters of users based on their adaptive overall user scores;

computing a different crawling frequency for each cluster of users for each of the plurality of network services based at least on the adaptive overall user scores and a pattern of content generation of the user activity feed;

enabling the aggregator to periodically crawl each of the plurality of network services based on the computed crawling frequency for each cluster of users to obtain updates to the respective network service for each of the users in the cluster; and distributing to each user in the plurality of users the obtained updates such that each is enabled to display the distributed updates at their respective client device.

8. The system of claim 7, wherein collecting information about each of the plurality of users further comprises collecting user specific information for each network service that includes at least one of a content generation pattern for each user, a strength of a user connection, a popularity of each user, a popularity of a posting by each user, a popularity of a topic or tag of content generated by each user, or information about a cyclical activity pattern for each user.

9. The system of claim 7, wherein generating an adaptive overall user score further comprises:

computing for each user for each network service at least two user measures: of an update score, a popularity score, a connection score, or a quality of vitality score; and generating the adaptive overall user score based on a weighted combination of the at least two user measures for each user for each network service.

10. The system of claim 7, wherein the adaptive aggregation component enables the computing device to perform actions, further comprising:

based in part on a change in at least one user's adaptive overall user score, reclassifying the at least one user into a different cluster for at least one network service.

11. The system of claim 7, wherein generating clusters of users based on their adaptive overall user scores further comprises using at least one of the following mechanisms to generate and cluster the users: K-means algorithm, expectation-maximization algorithm, or a co-relation clustering mechanism.

12. A computer-readable storage medium having computer executable instructions, the computer-executable instructions when installed onto a computing device enable the computing device to perform actions, comprising:

for each of a plurality of users of a user network service within aggregated feeds to which each user subscribes:

collecting information about the respective user's networking activity patterns, wherein the collected information includes at least one weight for content in the collected information, at least one strength value for a two-way relationship between the user and at least one other user, and at least one strength value for each service source that provides content;

determining from the collected information, a user's update score, popularity score, connection score, and quality of vitality score; and combining the user's update score, popularity score, connection score, and quality of vitality score to generate an adaptive overall user score; and based on the overall user scores for the each of the plurality of users, clustering the users into a plurality of different clusters;

assigning a different crawling frequency to each of the plurality of different clusters, wherein each crawling frequency is determined based at least on the adaptive overall user scores and a pattern of content generation of the user activity feed for each of the plurality of users that are clustered in each of the different clusters;

periodically crawling the feed service for each user within a given cluster within the plurality of different clusters at the assigned crawling frequency to collect update information from the network service for each user within the cluster; and distributing to each of the plurality of users the collected update information for the respective user to display at a respective client device.

13. The computer-readable storage medium of claim 12, wherein assigning the crawling frequency is based on a function of an average of overall scores for users within a cluster and at least one of a type of the network service, a pattern of content generation of the network service, or a rate limit for the network service.

14. The computer-readable storage medium of claim 12, wherein the collected information includes at least one of a content generation pattern for each user, a strength of a user's connections, a popularity of each user, a popularity of a posting by each user, a popularity of a topic or tag of content generated by each user, or a cyclical activity pattern for each user.

15. The computer-readable storage medium of claim 12, wherein clustering the users into a plurality of different clusters is performed using one of a K-means algorithm, an expectation-maximization algorithm, or a co-relation clustering algorithm.

16. The computer-readable storage medium of claim 12, based in part on a change in at least one user's adaptive overall user score, reclassifying the at least one user into a different cluster.

17. A method of providing aggregation feed updates, comprising:

collecting information about each of a plurality of users for each of a plurality of network services within aggregated feeds to which each user subscribes, to detect dynamic changes in each user's network activity, wherein the collected information includes at least one weight for content in the collected information, at least one strength value for a two-way relationship between the user and at least one other user, and at least one strength value for each service source that provides content;

employing the collected information about each of the plurality of users to generate an adaptive overall user score for each user for each network service;

for each of the plurality of network services, generating clusters of users based on their adaptive overall user scores;

computing a different crawling frequency for each cluster of users for each of the plurality of network services based at least on the adaptive overall user scores and a pattern of content generation of the user activity feed;

periodically crawling each of the plurality of network services based on the computed crawling frequency for each cluster of users to obtain updates to the respective network service for each of the users in the cluster; and distributing to each user in the plurality of users the obtained updates such that each is enabled to display the distributed updates at their respective client device.

18. The method of claim 17, wherein generating an adaptive overall user score farther comprises: generating the adaptive overall user score based on a weighted combination of an update score, a popularity score, a connection score, or a quality of vitality score.

19. The method of claim 17, wherein collecting information is performed at least once per day, and wherein generating an adaptive overall user score for each user is performed at least once per day.

20. The method of claim 17, wherein computing the crawling frequency further comprises determining the crawling frequency based on a type of network service, a pattern of content generation detected for the network service, or a rate limit for crawling the network service.

* * * * *